United States Patent
Martyka et al.

(10) Patent No.: US 11,585,437 B1
(45) Date of Patent: Feb. 21, 2023

(54) ROUND-ROBIN AIR PURGE METHODS FOR A ROTATING CLUTCH

(71) Applicant: GM GLOBAL TECHNOLOGY OPERATIONS LLC, Detroit, MI (US)

(72) Inventors: John Robert Martyka, South Lyon, MI (US); Bryan John Williams, Woodway, TX (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/653,063

(22) Filed: Mar. 1, 2022

(51) Int. Cl.
| | | |
|---|---|---|
| *F16H 61/12* | (2010.01) | |
| *F16H 61/30* | (2006.01) | |
| *F16D 48/06* | (2006.01) | |
| *F16H 59/68* | (2006.01) | |
| *F16H 59/72* | (2006.01) | |

(52) U.S. Cl.
CPC .......... *F16H 61/30* (2013.01); *F16D 48/066* (2013.01); *F16H 59/68* (2013.01); *F16H 59/72* (2013.01); *F16H 61/12* (2013.01); *F16H 2061/1232* (2013.01)

(58) Field of Classification Search
CPC .......... F16H 59/68; F16H 59/72; F16H 61/12; F16H 61/30; F16H 2061/1232; F16D 48/066
See application file for complete search history.

(56) References Cited

U.S. PATENT DOCUMENTS

| | | | |
|---|---|---|---|
| 7,912,617 B2 | 3/2011 | Wright et al. | |
| 9,982,774 B1* | 5/2018 | Jin | F16H 57/0446 |
| 2011/0269598 A1* | 11/2011 | Czoykowski | B60W 10/023 903/946 |
| 2015/0120105 A1* | 4/2015 | Naqvi | B60L 50/61 701/22 |

* cited by examiner

*Primary Examiner* — Edwin A Young
(74) *Attorney, Agent, or Firm* — Lorenz & Kopf LLP

(57) ABSTRACT

Vehicles and related systems and methods are provided for round-robin air purging of disengaged clutches. One method involves obtaining a plurality of weighting factors associated with respective ones of a plurality of clutches of a vehicle transmission, obtaining an exhaustion time associated with each respective clutch, determining a respective priority metric associated with the each respective clutch based at least in part on the exhaustion time associated with the respective clutch and the respective weighting factor associated with the respective clutch, determining a highest priority clutch of the plurality of clutches based at least in part on the respective priority metrics associated with the respective clutches of the plurality of clutches, and operating one or more valves in accordance with a pulse command to pulse the highest priority clutch with a commanded pressure for a commanded period of time.

20 Claims, 4 Drawing Sheets

ROUND-ROBIN AIR PURGE METHODS FOR A ROTATING CLUTCH

INTRODUCTION

The technical field generally relates to transmission control systems for vehicles and more particularly relates to transmission control systems and methods that purge air from a clutch of the transmission.

In an automatic transmission control valves supply hydraulic pressure to clutches and bands to engage each gear. A pump draws fluid from a sump in the bottom of the transmission and feeds it to the hydraulic system. Once the clutch is no longer required to be applied, the fluid is drained back to the sump. When the transmission is in park, neutral, or the engine is turned off, the pressurized fluid can be completely drained from the clutch and collected in a sump.

During this time, rotating clutches in a clutch-to-clutch transmission experience drain down issues that cause air to get into the clutch. Despite a bleed orifice, air becomes entrapped in the clutch. The trapped air causes the first shifts after complete drain down to flare. Accordingly, it is desirable to purge air from the clutch of the transmission to improve passenger comfort. Other desirable features and characteristics will become apparent from the subsequent detailed description and the appended claims, taken in conjunction with the accompanying drawings and the foregoing technical field and background.

SUMMARY

A method of operating a transmission of a vehicle is provided. The method involves a control module associated with the transmission of the vehicle obtaining a plurality of weighting factors, wherein each respective weighting factor of the plurality of weighting factors is associated with a respective clutch of a plurality of clutches of a transmission of the vehicle, obtaining an exhaustion time associated with each respective clutch of the plurality of clutches, determining a respective priority metric associated with the respective clutch based at least in part on the exhaustion time associated with the respective clutch and the respective weighting factor associated with the respective clutch, determining a highest priority clutch of the plurality of clutches based at least in part on the respective priority metrics associated with the respective clutches of the plurality of clutches, and operating one or more valves in accordance with a pulse command to pulse the highest priority clutch with a commanded pressure for a commanded period of time.

In one example, the method involves resetting a timer for the exhaustion time associated with the highest priority clutch after operating the one or more valves to pulse the highest priority clutch. In another example, the control module determines an updated highest priority clutch of the plurality of clutches based at least in part on the respective priority metric associated with the respective clutches of the plurality of clutches after resetting the timer for the exhaustion time associated with the highest priority clutch, wherein the updated highest priority clutch is different from the highest priority clutch, and operates the one or more valves in accordance with a second pulse command to pulse the updated highest priority clutch with a second commanded pressure for a second commanded period of time after pulsing the highest priority clutch.

In another example, the method involves identifying the plurality of clutches of the transmission of the vehicle that are disengaged based on a current drive ratio indicated by a range selection device, wherein the clutches are realized as a plurality of rotating clutches of the transmission when the current drive ratio corresponds to park or neutral. In another example, the method involves the control module operating the one or more valves in accordance with a priming pulse command to pulse a braking clutch prior to pulsing the highest priority clutch. According to another example, the method involves obtaining a current temperature measurement from a temperature sensor associated with the transmission, wherein obtaining the plurality of weighting factors involves identifying the plurality of weighting factors corresponding to the current temperature measurement. In yet another example, the method involves operating the one or more valves in accordance with the pulse command to pulse the highest priority clutch by actuating a piston associated with the highest priority clutch from an exhausted state to an intermediate actuation state without engaging the highest priority clutch.

An apparatus is provided for a vehicle that includes a transmission including a plurality of clutches, one or more valves operable to control operation of the plurality of clutches, a data storage element maintaining computer readable instructions, and a processing device for executing the computer readable instructions. The computer readable instructions control the processing device to perform operations including obtaining a plurality of weighting factors, wherein each respective weighting factor of the plurality of weighting factors is associated with a respective clutch of the plurality of clutches, obtaining, for each respective clutch of the plurality of clutches, an exhaustion time associated with the respective clutch, determining, for each respective clutch of the plurality of clutches, a respective priority metric associated with the respective clutch based at least in part on the exhaustion time associated with the respective clutch and the respective weighting factor associated with the respective clutch, determining a highest priority clutch of the plurality of clutches based at least in part on the respective priority metrics associated with the respective clutches of the plurality of clutches, and operating the one or more valves in accordance with a pulse command to pulse the highest priority clutch with a commanded pressure for a commanded period of time.

In one example, the vehicle includes a temperature sensor to obtain a current temperature measurement associated with the transmission, wherein the weighting factors are influenced by the current temperature measurement. In another example, the computer readable instructions control the processing device to perform operations including determining an updated highest priority clutch of the plurality of clutches based at least in part on the respective priority metric associated with the respective clutches of the plurality of clutches after resetting a timer for the exhaustion time associated with the highest priority clutch, wherein the updated highest priority clutch is different from the highest priority clutch, and operating the one or more valves in accordance with a second pulse command to pulse the updated highest priority clutch with a second commanded pressure for a second commanded period of time after pulsing the highest priority clutch. In another example, the computer readable instructions control the processing device to perform operations including identifying the plurality of clutches of the transmission of the vehicle that are disengaged based on a current drive ratio indicated by a range selection device, wherein the plurality of clutches include a plurality of rotating clutches of the transmission when the current drive ratio corresponds to park or neutral. In another example, the computer readable instructions control the processing device to perform operations including operating the one or more valves in accordance with a priming pulse command to pulse a braking clutch prior to pulsing the highest priority clutch.

A vehicle system is provided that includes a transmission including a plurality of clutches, a pressure source, one or more valves coupled between the pressure source and the plurality of clutches to control pressure applied to the plurality of clutches, and a control module coupled to the one or more valves to determine, for each respective clutch of the plurality of clutches, a respective priority metric associated with the respective clutch based at least in part on an exhaustion time associated with the respective clutch and a respective weighting factor associated with the respective clutch, identify a highest priority clutch of the plurality of clutches based at least in part on the respective priority metrics associated with the respective clutches of the plurality of clutches, and operate the one or more valves in accordance with a pulse command to pulse the highest priority clutch with a commanded pressure for a commanded period of time.

In one example, the vehicle system includes a temperature sensor to obtain a current temperature measurement associated with the transmission, wherein the control module is coupled to the temperature sensor to identify the respective weighting factor in a manner that is influenced by the current temperature measurement. In another example, the control module is configured to dynamically determine an updated highest priority clutch of the plurality of clutches based at least in part on the respective priority metric associated with the respective clutches of the plurality of clutches after resetting a timer for the exhaustion time associated with the highest priority clutch and operate the one or more valves in accordance with a second pulse command to pulse the updated highest priority clutch with a second commanded pressure for a second commanded period of time after pulsing the highest priority clutch, wherein the updated highest priority clutch is different from the highest priority clutch. In another example, the vehicle system includes a range selection device to provide a signal indicative of a current drive ratio of the transmission, wherein the control module is coupled to the range selection device to identifying the plurality of clutches of the transmission that are disengaged based on the current drive ratio, where in some examples the clutches are realized as a plurality of rotating clutches of the transmission. In another example, the control module is configured to operate the one or more valves in accordance with a priming pulse command to pulse a braking clutch prior to pulsing the highest priority clutch of the plurality of rotating clutches.

BRIEF DESCRIPTION OF THE DRAWINGS

The exemplary implementations will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
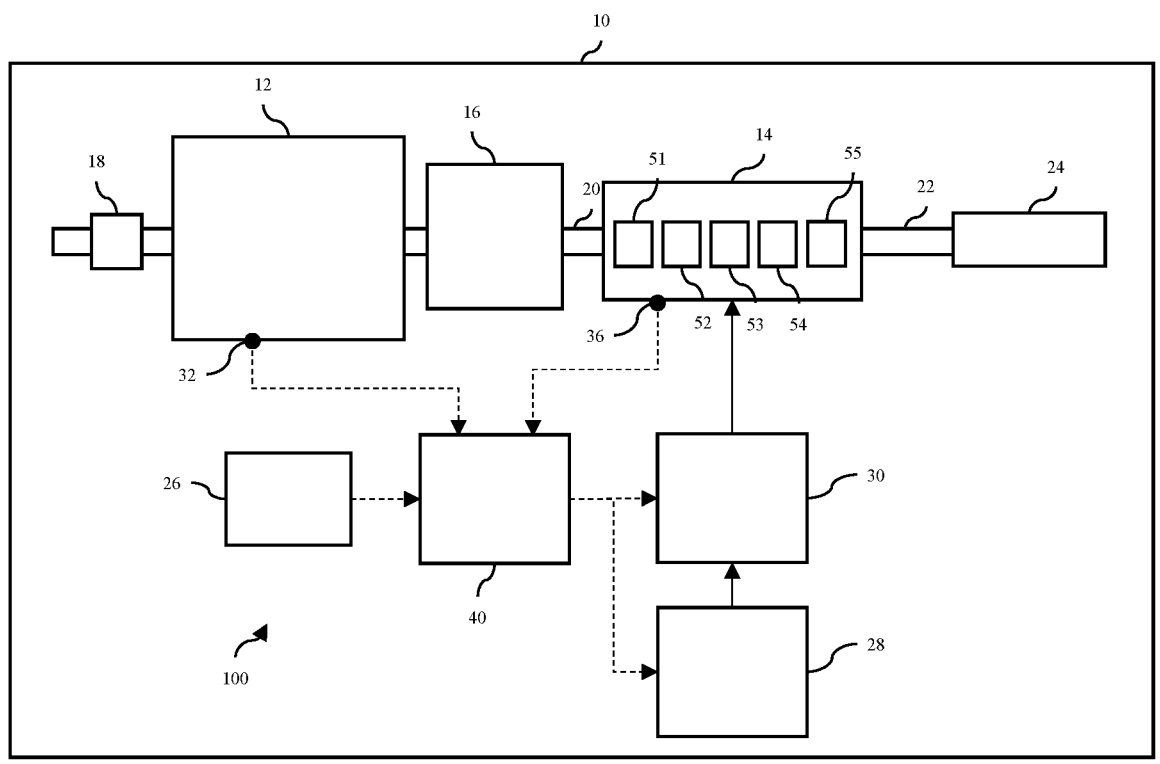
FIG. 1 depicts a block diagram of a system suitable for use with a vehicle according to one or more implementations described herein.

FIG. 1 depicts an exemplary system 100 suitable for use with a vehicle 10 to provide round-robin air purge. The vehicle includes an engine 12 that drives a transmission 14 through a torque converter 16. Air is drawn into the engine 12 through a throttle 18. The air is mixed with fuel and combusted within cylinders of the engine 12 to produce drive torque. The torque converter 16 supplies the engine torque to the transmission via an input shaft 20. The transmission 14 in the exemplary implementation is a multi-speed, automatic, clutch-to-clutch transmission that drives an output shaft 22 based on engine torque.

The output shaft 22 drives a driveline 24 of the vehicle 10. A range selection device 26 enables an operator to set the transmission 14 at a desired operating range including, but not limited to, park, reverse, neutral, and one or more forward drive positions. The speed and torque relationships between the engine 12 and the driveline 24 are controlled by hydraulically operated clutches 51, 52, 53, 54, 55 of the transmission 14. Pressurized fluid is provided to the clutches from a regulated hydraulic pressure source 28. The clutches 51, 52, 53, 54, 55 are coupled to the hydraulic pressure source via control valves 30, which regulate clutch pressure by supplying or discharging fluid to/from the clutches 51, 52, 53, 54, 55.

In one or more exemplary implementations, the five clutches 51, 52, 53, 54, 55 of the transmission 14 are selectively engaged to provide neutral, one or more reverse drive ratios, and one or more forward drive ratios. Although the subject matter may be described herein in the context of an automatic transmission 14 that includes eight forward drive ratios (e.g., an 8-speed transmission), it should be appreciated that the round-robin air purge methods and systems for a rotating clutch described herein can be implemented in automatic transmissions having more or fewer drive ratios. Different combinations or subsets of the clutches 51, 52, 53, 54, 55 correspond to or otherwise establish the different drive ratios associated with the transmission 14. For example, a first forward drive ratio may be established by engaging the first clutch 51, the second clutch 52 and the third clutch 53, a second forward drive ratio may be established by disengaging the third clutch 53 and substantially simultaneously engaging the fourth clutch 54, a third forward drive ratio may be established by disengaging the first clutch 51 and substantially simultaneously engaging the third clutch 53, a fourth forward drive ratio may be established by disengaging the third clutch 53 while substantially simultaneously engaging the fifth clutch 55, a fifth forward drive ratio may be established by disengaging the fourth clutch 54 and substantially simultaneously engaging the third clutch 53, a sixth forward drive ratio may be established by disengaging the second clutch 52 and substantially simultaneously engaging the fourth clutch 54, a seventh forward drive ratio may be established by disengaging the fourth clutch 54 and substantially simultaneously engaging the first clutch 51, and an eighth forward drive ratio may be established by disengaging the fourth clutch 54 and substantially simultaneously engaging the third clutch 53. In one implementation, the reverse drive ratio is established by engaging the first clutch 51, the second clutch 52 and the fifth clutch 55, and the transmission 14 is in neutral when only the first and second clutches 51, 52 are engaged.

Still referring to FIG. 1, a speed sensor 32 senses a rotational speed of the engine 12 and generates an engine speed signal. A temperature sensor 36 senses a temperature of the transmission fluid and generates a transmission temperature signal. The range selection device 26 generates a range signal.

In one or more exemplary implementations, the control module 40 generally represents a processing system, computing device, computing system or another combination of processing logic, circuitry, hardware, and/or other components configured to receive the above-mentioned signals and control the operation of the control valves 30 in order to pulse on and off clutches of the transmission 14 and support the related processes, tasks, operations, and/or functions described herein. In this regard, the control module 40 may be implemented using any suitable processing system and/or device, such as, for example, one or more processors, central processing units (CPUs), controllers, microprocessors, microcontrollers, processing cores and/or other hardware computing resources configured to support the operation of the control module 40 described herein. The control module 40 may also include or otherwise access a data storage element (or memory) capable of storing programming instructions for execution by the control module 40, that, when read and executed, cause control module 40 to support the processes described herein. Depending on the implementation, the memory may be realized as a random-access memory (RAM), read only memory (ROM), flash memory, magnetic or optical mass storage, or any other suitable non-transitory short or long-term data storage or other computer-readable media, and/or any suitable combination thereof.

Figure 2:
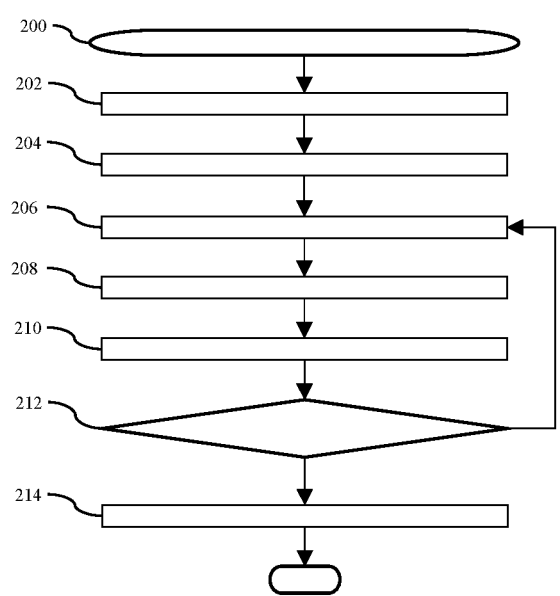
FIG. 2 depicts a flow diagram of a transmission priming process suitable for implementation by the system of FIG. 1 according to one or more implementations described herein.

FIG. 2 depicts an exemplary implementation of a transmission priming process 200 suitable for implementation by a vehicle system, such as the system 100 associated with the vehicle 10 according to one or more implementations described herein. For illustrative purposes, the following description may refer to elements mentioned above in connection with FIG. 1. While portions of the transmission priming process 200 may be performed by different elements of a vehicle system, for purposes of explanation, the subject matter may be primarily described herein in the context of the transmission priming process 200 being primarily performed by the control module 40.

In exemplary implementations, the transmission priming process 200 is automatically initiated or otherwise performed autonomously in response to the control module 40 detecting or otherwise identifying a wake-up event in advance of a user operating the vehicle 10. For example, the control module 40 may automatically initiate the transmission priming process 200 in response to detecting an electronic key fob associated with the vehicle 10 in the proximity of the vehicle 10 or in response to receiving one or more signals from the electronic key fob associated with the vehicle 10 indicative of a potential desire to operate the vehicle 10. In this regard, the transmission priming process 200 is performed to purge or otherwise expunge air from the clutches 51, 52, 53, 54, 55 and move or otherwise warm up the pistons associated with the clutches 51, 52, 53, 54, 55 (e.g., to lubricate the pistons, seals, etc.) prior to a shift event to improve passenger comfort associated with the initial shifts (e.g., to/from one or more of the forward drive ratios described above) after the engine 12 is turned on (e.g., by reducing the likelihood of mistimed shift events, momentary neutrals, etc.).

The transmission priming process 200 initiates or otherwise begins by pulsing a first braking clutch associated with the transmission to prime the first braking clutch at 202. In exemplary implementations, the control module 40 provides a command, signal or other instruction to enable the pressure source 28 and then commands, signals or otherwise operates the respective control valve 30 associated with a first braking clutch 52 (alternatively referred to herein as the C2 clutch) to provide a pulse of pressure to the respective piston associated with the C2 clutch 52 to actuate the piston from a fully disengaged state of the C2 clutch 52 through a range of motion of the piston until reaching an intermediate state where the C2 clutch 52 is not engaged. In this regard, the control module 40 operates the C2 control valve 30 to enable a commanded amount of pressure to the C2 piston for a commanded duration of time, where the combination of the commanded amount of pressure and the commanded duration of time is configured to actuate the C2 piston without causing the C2 clutch 52 to engage gears of the transmission 14. In one or more implementations, the control module 40 operates the C2 control valve 30 to stage the commanded amount of pressure by initially providing a pulse of a higher amount of pressure to the C2 piston before reducing the amount of pressure applied to the C2 piston to a lower amount of pressure configured to maintain the current state of actuation of the C2 clutch 52 for the remaining duration of the transmission priming process 200.

In a similar manner, the transmission priming process 200 pulses a second braking clutch associated with the transmission to prime the second braking clutch at 204. Similar to the first braking clutch 52, the control module 40 provides a command, signal or other instruction to operate the respective control valve 30 associated with a second braking clutch 51 (alternatively referred to herein as the C1 clutch) to provide a pulse of pressure to the respective piston associated with the C1 clutch 51 to actuate the piston from a fully disengaged state of the C1 clutch 51 through a range of motion of the piston until reaching an intermediate state where the C1 clutch 51 is not engaged. In this regard, the control module 40 operates the C1 control valve 30 to enable a commanded amount of pressure to the C1 piston for a commanded duration of time, where the combination of the commanded amount of pressure and the commanded duration of time is configured to actuate the C1 piston without causing the C1 clutch 51 to engage gears of the transmission 14. Similar to the C2 clutch 52, in one or more implementations, the control module 40 stages the commanded amount of pressure by initially operating the C1 control valve 30 to provide a pulse of a higher amount of pressure to the C1 piston before operating the C1 control valve 30 to reduce the amount of pressure applied to the C1 piston to a lower amount of pressure configured to maintain the current state of actuation of the C1 clutch 51 for the remaining duration of the transmission priming process 200.

After priming the braking clutches, the transmission priming process 200 continues by receiving or otherwise obtaining measurement data indicative of the current temperature of the transmission at 206, identifying, determining or otherwise obtaining weighting factors associated with respective ones of the rotating clutches of the transmission that correspond to the current temperature at 208 and then alternately pulses the rotating clutches in a round-robin manner based at least in part on the respective weighting factors at 210. In this regard, as described in greater detail below in the context of the round-robin air purge process 300 of FIG. 3, the temperature-dependent weighting factors are utilized by the control module 40 to dynamically determine and assign different priorities to the rotating clutches 53, 54, 55 of the transmission 14 and then alternately pulse the different respective ones of the rotating clutches 53, 54, 55 in a round-robin manner according to the respective priorities associated therewith.

In exemplary implementations, the transmission priming process 200 continually pulses the rotating clutches in a round-robin manner in accordance with the temperature-dependent weighting factors associated therewith while maintaining the primed actuation state of the braking clutches until detecting an engine startup event at 212. In response to the engine startup, the transmission priming process 200 disengages the braking clutches from their primed actuation states at 214. In this regard, in response to receiving a signal or other indication of the engine 12 starting, the control module 40 operates the C1 and C2 control valves 30 to remove pressure from the C1 and C2 clutches 51, 52 to allow the C1 and C2 clutches 51, 52 to revert to a fully disengaged state as the C1 and C2 pistons become exhausted. By maintaining the C1 and C2 clutches 51, 52 in the primed actuation state until engine startup, the air is purged from the C1 and C2 pistons prior to the initial shift event where at least one of the C1 and C2 braking clutches 51, 52 is engaged (e.g., in first gear).

Figure 3:
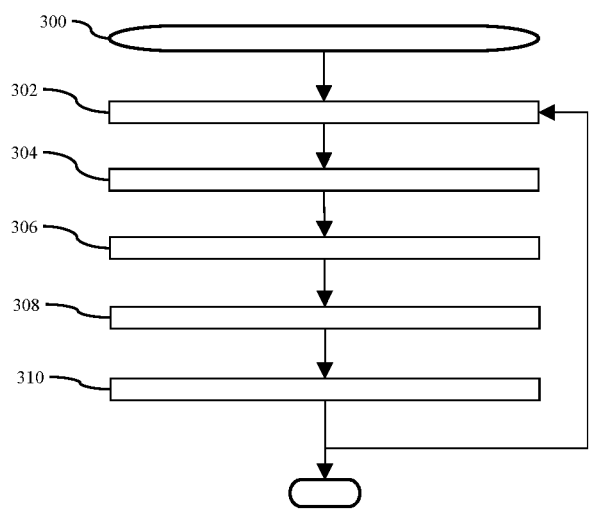
FIG. 3 depicts a flow diagram of a round-robin air purge process suitable for implementation by the system of FIG. 1 according to one or more implementations described herein.

FIG. 3 depicts an exemplary implementation of a round-robin air purge process 300 suitable for implementation to purge air from disengaged clutches of a transmission. For illustrative purposes, the following description may refer to elements mentioned above in connection with FIG. 1. While portions of the round-robin air purge process 300 may be performed by different elements of a vehicle system, for purposes of explanation, the subject matter may be primarily described herein in the context of the round-robin air purge process 300 being primarily performed by the control module 40. In one or more exemplary implementations, the round-robin air purge process 300 is performed in connection with the transmission priming process 200 (e.g., at 210). That said, in other implementations, the round-robin air purge process 300 may be implemented independent of the transmission priming process 200. For example, in some implementations, the round-robin air purge process 300 is performed after a startup event while the engine 12 is on whenever the transmission 14 is in park or neutral to continually purge air from the disengaged clutches in advance of a future shift event. Moreover, in some implementations, the round-robin air purge process 300 may be implemented when a particular drive ratio is engaged or otherwise implemented at the transmission 14 to purge air from the remaining subset of disengaged clutches that are not involved in the current drive ratio.

The round-robin air purge process 300 initializes or otherwise begins by identifying a subset of clutches that are disengaged and available for purging at 302. In this regard, when implemented in connection with the transmission priming process 200 of FIG. 2, the control module 40 identifies the rotating clutches 53, 54, 55 as the subset of clutches available for round-robin purging. That said, in implementations when the round-robin air purge process 300 is performed while the engine 12 is on, the control module 40 may identify the subset of clutches of the transmission 14 that are currently disengaged based on the current drive ratio indicated by the range selection device 26, for example, by identifying the subset of clutches that are not associated with or otherwise involved with making the current drive ratio and excluding the clutches that are engaged to make the current drive ratio.

After identifying the subset of clutches available for purging, the round-robin air purge process 300 calculates or otherwise determines, for each of the potential clutches, a corresponding priority metric associated therewith based at least in part on the weighting factor associated with the respective clutch at 304 and then selects or otherwise identifies the highest priority clutch from among the subset of available clutches based on the priority metrics associated with the clutches at 306. In exemplary implementations, for each available clutch, the control module 40 calculates or otherwise determines a current value for the priority metric to be associated with that respective clutch as a function of the identified weighting factor associated with that respective clutch for the current temperature (e.g., obtained at 206) and the exhaustion time associated with the respective clutch, for example, by multiplying the respective exhaustion time by the respective weighting factor to calculate a respective priority score to be assigned to the respective clutch. The exhaustion time (or drain-down time) represents the amount of time that has elapsed since the respective clutch was returned to a deenergized and fully disengaged state after it was most recently engaged, pulsed or otherwise actuated from the fully disengaged state. Accordingly, each of the clutches may have a different exhaustion time associated therewith based on differences between when the clutches were most recently energized or actuated as well as differences or variations in exhaust rates between clutches (e.g., where some clutches return to a deenergized and fully disengaged state faster or slower than others). The weighting factor represents the relative priority of the respective clutch that reflects the degree or amount to which actuation of that respective clutch during a shift event is associated with occurrence of a mistimed shift event, a momentary neutral and/or the like. In this regard, the transmission 14 may be calibrated prior to deployment in a vehicle 10, where the behavior of the different clutches is analyzed at different operating temperatures (or operating temperature ranges) and each respective clutch is assigned respective weighting factors for those different operating temperatures (or operating temperature ranges) based on the behavior of each respective clutch relative to the other clutches for the respective operating temperature (or temperature range). Accordingly, in addition to the potential or likelihood of the available clutches having different exhaustion times associated therewith relative to other ones of the available clutches, the available clutches may also have different respective weighting factors associated therewith (which may also vary based on temperature), such that each of the clutches may be assigned a different priority score calculated for that respective clutch. Moreover, as time elapses, the respective exhaustion times associated with the respective clutches will also vary with respect to time, such the priority scores associated with the available clutches will dynamically vary with respect to time as the exhaustion times vary.

After calculating or otherwise determining the current priority score for each of the available clutches, the control module 40 selects or otherwise identifies the clutch having the highest priority score (e.g., the highest product of its associated weighting factor and exhaustion time) as the highest priority clutch to be purged during the current iteration of the round-robin air purge process 300. After identifying the highest priority clutch at 306, the round-robin air purge process 300 pulses the selected clutch at 308. In this regard, in a similar manner as described above, the control module 40 commands, signals or otherwise operates the respective control valve 30 associated with the selected clutch to provide a pulse of pressure to the respective piston associated with the highest priority clutch to actuate the piston from a fully disengaged state through a range of motion of the piston using a commanded amount of pressure for a commanded duration of time, where the combination of the commanded amount of pressure and the commanded duration of time is configured to actuate the piston of the selected clutch without causing the clutch to engage gears of the transmission 14. After pulsing the highest priority clutch at 308, the round-robin air purge process 300 resets or otherwise reinitializes an exhaustion timer or similar feature associated with the respective clutch at 310. For example, in one or more implementations, the control module 40 implements a timer or similar feature for each of the clutches that tracks the amount of time that has elapsed with the respective clutch in the fully disengaged state. In this regard, after pulsing the selected clutch, the control module 40 resets the value of the timer to zero and then reinitiates the timer once the piston associated with the selected clutch has exhausted and restored the clutch to its fully disengaged state. That said, in other implementations, the control module 40 may store or otherwise maintain a timestamp associated with when a respective clutch was most recently pulsed or disengaged and then calculate or otherwise determine the current exhaustion time associated with a respective clutch based on the difference between a current time and the respective timestamp associated with that respective clutch.

Still referring to FIG. 3, the loop defined by 302, 304, 306, 308 and 310 repeats continually while the round-robin air purge process 300 is active or otherwise enabled to alternately pulse different ones of the available clutches in a round-robin manner in accordance with the respective weighting factors and exhaustion times. In this regard, the order and sequence of clutches will vary depending on the weighting factors and the exhaustion times. For example, clutches assigned higher priority weighting factors may be preferentially pulsed more frequently than clutches assigned lower priority weighting factors, but by virtue of the exhaustion times associated with those clutches being continually reset after each pulse, clutches assigned lower priority weighting factors will still be periodically pulsed during the round-robin air purge process 300 as their respective exhaustion times accrue to values that negate or otherwise offset the difference in weighting factors. In this manner, the round-robin air purge process 300 ensures that all available clutches will be pulsed, while preferentially pulsing clutches that are more likely to be problematic with greater frequency to better purge air and lubricate those clutches to reduce the likelihood of mistimed shift events, momentary neutrals and/or the like.

Figure 4:
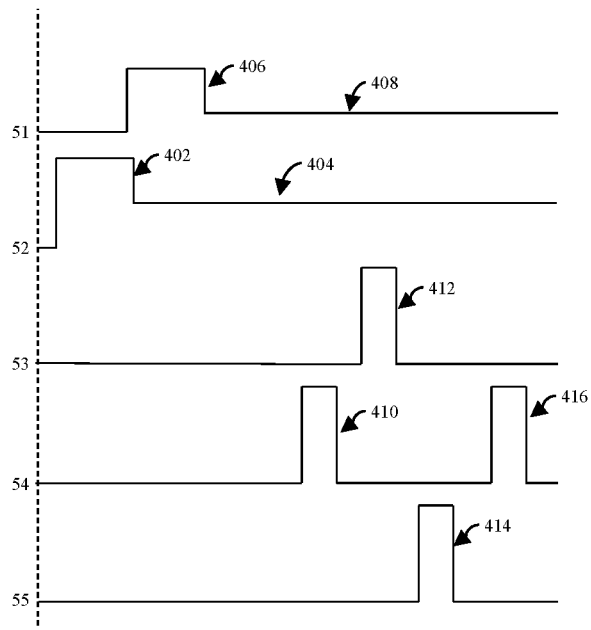
FIG. 4 is a timing diagram depicting an example implementation of the round-robin air purge process of FIG. 3 in the context of the transmission priming process of FIG. 2 according to one or more implementations described herein.

FIG. 4 is a timing diagram depicting a sequence of pulses applied to different ones of the clutches 51, 52, 53, 54, 55 of the transmission 14 in connection with an example implementation of the transmission priming process 200 that incorporates the round-robin air purge process 300 to alternately pulse the rotating clutches 53, 54, 55 at 210. As described above, in response to a wake-up event, the control module 40 operates the C2 control valve 30 to prime the C2 braking clutch by applying an initial pulse stage 402 having a relatively higher pressure for a temporary duration of time followed by a second pulse stage 404 having a relatively higher pressure for the remaining duration of time until a startup event. In this regard, the amount or magnitude of the commanded pressure associated with the initial pulse stage 402 is calibrated or otherwise configured in concert with the duration (or width) of the initial pulse stage 402 to actuate the C2 piston from a fully exhausted and disengaged state of the C2 clutch 52 at least partially through the range of motion of the piston until reaching an intermediate actuation state where the C2 clutch 52 is not engaged. After the calibrated duration of time associated with the initial pulse stage 402 (which may be stored or otherwise maintained in a data storage associated with the control module 40), the control module 40 operates the C2 control valve 30 to reduce the amount of pressure applied to the C2 piston to the lower amount of pressure associated with the subsequent pulse stage 404 to maintain the current partially actuated state of the C2 clutch 52 for the remaining duration of the transmission priming process 200 so that the C2 clutch 52 is not exhausted until the startup event. After pulsing the C2 braking clutch 52, the control module 40 operates the C1 control valve 30 in a similar manner to provide an initial pulse stage 406 having a relatively higher pressure for a temporary duration of time to actuate the C1 piston from a fully disengaged state of the C1 clutch 51 through a range of motion of the piston until reaching an intermediate actuation state before reducing the commanded pressure to provide a second pulse stage 408 associated with a lower pressure that is configured to maintain the partially actuated state of the C1 clutch 51 without engaging the C1 clutch 51 until a startup event.

After priming the braking clutches 51, 52, the control module 40 obtains the current temperature measurement from the temperature sensor 36 and then utilizes the corresponding weighting factors associated with the rotating clutches 53, 54, 55 to alternately pulse the rotating clutches 53, 54, 55 one at a time in a round-robin manner in a sequence that may dynamically vary over time depending on the weighting factors. In this regard, FIG. 4 depicts a scenario where, upon initialization of the round-robin air purge process 300 at 210, the current value for the priority metric associated with the C4 clutch 54 (e.g., the product of the C4 weighting factor for the current temperature and the current exhaustion timer value for the C4 clutch 54) is greater than the respective values for the priority metric associated with the other rotating clutches 53, 55. Thus, the control module 40 identifies or otherwise selects the C4 clutch 54 as the current highest priority clutch (e.g., at 306) and then operates the C4 control valve 30 to provide a pulse 410 having a commanded pressure associated therewith for a commanded duration of time (e.g., at 308), where the combination of the commanded pressure and the commanded duration are cooperatively configured to actuate the C4 piston from a fully exhausted and disengaged state of the C4 clutch 54 at least partially through the range of motion of the C4 piston until reaching an intermediate actuation state without engaging the C4 clutch 54. For example, the control module 40 may open the C4 control valve 30 by an amount that corresponds to the commanded amount of pressure for the pulse 410 for the commanded duration for the pulse 410 and then close the C4 control valve 30 after the commanded duration to depressurize the C4 piston and allow the C4 piston to begin exhausting from the partially actuated state to an exhausted state where the C4 clutch 54 is fully disengaged.

After pulsing the C4 clutch 54, the control module 40 waits for an exhaust period to allow for the C4 clutch 54 to begin exhausting before dynamically determining an updated highest priority clutch and pulsing the updated highest priority clutch. For example, after pulsing the C4 clutch 54 and resetting the C4 exhaustion timer, while the C4 clutch 54 is still exhausting, the control module 40 determines updated priority values for the currently exhausted rotating clutches 53, 55 to identify which clutch is now the highest priority clutch to be pulsed. In this regard, FIG. 4 depicts a scenario where the current value for the priority metric associated with the C3 clutch 53 (e.g., the product of the C3 weighting factor for the current temperature and the current exhaustion timer value for the C3 clutch 53) is greater than the respective values for the priority metric associated with the C5 clutch 55. Thus, the control module 40 identifies or otherwise selects the C3 clutch 53 as the updated and now currently highest priority clutch (e.g., at 306) and then operates the C3 control valve 30 to provide a pulse 412 having a commanded pressure and a commanded duration of time (e.g., at 308) associated therewith that are cooperatively configured to actuate the C3 piston from a fully exhausted and disengaged state of the C3 clutch 53 at least partially through the range of motion of the C3 piston until reaching an intermediate actuation state without engaging the C3 clutch 53.

In a similar manner as described above in the context of pulsing the C4 clutch 54, after pulsing the C3 clutch 53, the control module 40 waits for an exhaust period to allow for the C3 clutch 53 to begin exhausting before dynamically determining an updated highest priority clutch and pulsing the updated highest priority clutch. For example, after pulsing the C3 clutch 53 and resetting the C3 exhaustion timer, while the C3 clutch 53 is still exhausting, the control module 40 determines updated priority values for the other rotating clutches 54, 55 to identify which clutch is now the highest priority clutch to be pulsed. In this regard, FIG. 4 depicts a scenario where the current value for the priority metric associated with the C5 clutch 55 (e.g., the product of the C5 weighting factor for the current temperature and the current exhaustion timer value for the C5 clutch 55) is greater than the respective values for the priority metric associated with the C4 clutch 54. In this regard, the exhaustion time associated with the C4 exhaustion timer will be less than the exhaustion time associated with the C5 clutch 55 by virtue of the C4 clutch 54 having been previously pulsed more recently. That said, in some scenarios, if the weighting factor associated with the C4 clutch 54 were significantly higher than the weighting factor associated with the C5 clutch 55, the C4 clutch 54 could alternatively be identified as the highest priority clutch and pulsed a second time prior to pulsing the C5 clutch 55 a first time. Alternatively, in a scenario where the C4 clutch 54 has not reached a fully exhausted state, the C4 exhaustion timer may be maintained at a zero value, the priority metric for both the C4 clutch 54 and the C3 clutch 53 may be equal to zero, such that the C5 clutch 55 is identified as the highest priority clutch available for pulsing.

In a similar manner as described above in the context of the C3 and C4 clutches, the control module 40 operates the C5 control valve 30 to provide a pulse 414 having a commanded pressure and a commanded duration of time configured to actuate the C5 piston from a fully exhausted and disengaged state of the C5 clutch 55 at least partially through the range of motion of the C5 piston without engaging the C5 clutch 55. After pulsing the C5 clutch 55 and resetting the C5 exhaustion timer, FIG. 4 depicts a scenario where the control module 40 identifies the C4 clutch 54 as the updated highest priority exhausted clutch during the next iteration of the round-robin air purge process 300 and operates the C4 control valve 30 to provide another pulse 416 having a commanded pressure and a commanded duration of time, in a similar manner as described above. In this regard, the control module 40 implements or otherwise performs round-robin air purge process 300 during the transmission priming process 200 to alternately pulse different ones of the rotating clutches 53, 54, 55 in an order or sequence capable of dynamically varying over time based on the relationships between the respective weighting factors and exhaustion times associated with the respective clutches 53, 54, 55. Additionally, in some implementations, when the round-robin air purge process 300 is implemented or otherwise performed independent of the transmission priming process 200, the subset of the clutches 51, 52, 53, 54, 55 available for purging may vary depending on the current drive ratio of the transmission 14 indicated by the range selection device 26. For example, in some implementations, the round-robin air purge process 300 is initiated after an engine start-up event whenever the vehicle 10 is in park or neutral.

It will be appreciated that the timing diagram depicted FIG. 4 is a simplified representation for purposes of explanation and is not intended to be limiting. In practice, it should be noted that in practice, the commanded amounts of pressure and/or the commanded durations associated with the different pulses 402, 404, 406, 408, 410, 412, 414, 416 may vary between clutches 51, 52, 53, 54, 55 to reflect differences between the clutches 51, 52, 53, 54, 55, and may vary from one transmission 14 to another transmission 14. In this regard, the clutches 51, 52, 53, 54, 55 of the transmission 14 may be calibrated prior to deployment in a vehicle 10 to determine the relationship between the amount of applied pressure and the amount of actuation of the respective clutch 51, 52, 53, 54, 55, which, in turn, may be utilized to derive the commanded pressures and durations for the respective pulses 402, 404, 406, 408, 410, 412, 414, 416 to achieve the desired actuation of the respective clutch 51, 52, 53, 54, 55 while ensuring that the respective clutch 51, 52, 53, 54, 55 does not become engaged during the transmission priming process 200 and/or the round-robin air purge process 300. Additionally, in some implementations, the amount of time required for each respective clutch 51, 52, 53, 54, 55 to become exhausted after actuation may also be calibrated or otherwise determined and utilized to determine when to reinitiate the exhaustion timer associated with the respective clutch 51, 52, 53, 54, 55 while accounting for variations in exhaust rates between different instances of the transmission 14, thereby allowing the clutches 51, 52, 53, 54, 55 to become fully exhausted during the round-robin air purge process 300 prior to being pulsed again in a manner.

By pulsing disengaged clutches of a multi-clutch transmission 14 in a round-robin manner to partially actuate the clutches, the clutches 51, 52, 53, 54, 55 of a multi-clutch transmission 14 and the pistons and/or other hydraulic actuators associated therewith may be purged of air, lubricated, and otherwise primed for actuation in advance of a shift event where one or more of the clutches 51, 52, 53, 54, 55 is actuated and engaged within the transmission 14 to form a drive ratio, thereby reducing the likelihood of anomalous shift events (e.g., a momentary neutral, a mistimed shift event or other anomalous shifting behavior). Moreover, by virtue of the temperature-dependent weighting factors and exhaustion timers, particular ones of the clutches 51, 52, 53, 54, 55 that would otherwise be more likely to be problematic can be purged and lubricated with greater frequency or priority, thereby reducing the likelihood of that particular clutch exhibiting anomalous behavior during a subsequent shift event.

While at least one exemplary implementation has been presented in the foregoing detailed description, it should be appreciated that a vast number of variations exist. It should also be appreciated that the exemplary implementation or exemplary implementations are only examples, and are not intended to limit the scope, applicability, or configuration of the disclosure in any way. Rather, the foregoing detailed description will provide those skilled in the art with a convenient road map for implementing the exemplary implementation or exemplary implementations. It should be understood that various changes can be made in the function and arrangement of elements without departing from the scope of the disclosure as set forth in the appended claims and the legal equivalents thereof.

What is claimed is:

1. A method of operating a transmission of a vehicle, the method comprising:
   obtaining, by a control module, a plurality of weighting factors, wherein each respective weighting factor of the plurality of weighting factors is associated with a respective clutch of a plurality of clutches of the transmission of the vehicle;
   for each respective clutch of the plurality of clutches:
      obtaining, by the control module, an exhaustion time associated with the respective clutch; and
      determining by the control module, a respective priority metric associated with the respective clutch based at least in part on the exhaustion time associated with the respective clutch and the respective weighting factor associated with the respective clutch;
   determining, by the control module, a highest priority clutch of the plurality of clutches based at least in part on the respective priority metrics associated with the respective clutches of the plurality of clutches; and
   operating, by the control module, one or more valves in accordance with a pulse command to pulse the highest priority clutch with a commanded pressure for a commanded period of time.

2. The method of claim 1, further comprising resetting a timer for the exhaustion time associated with the highest priority clutch after operating the one or more valves to pulse the highest priority clutch.

3. The method of claim 2, further comprising:
   determining, by the control module, an updated highest priority clutch of the plurality of clutches based at least in part on the respective priority metric associated with the respective clutches of the plurality of clutches after resetting the timer for the exhaustion time associated with the highest priority clutch, wherein the updated highest priority clutch is different from the highest priority clutch; and
   operating, by the control module, the one or more valves in accordance with a second pulse command to pulse the updated highest priority clutch with a second commanded pressure for a second commanded period of time after pulsing the highest priority clutch.

4. The method of claim 1, further comprising identifying the plurality of clutches of the transmission of the vehicle that are disengaged based on a current drive ratio indicated by a range selection device.

5. The method of claim 4, wherein the plurality of clutches comprises a plurality of rotating clutches of the transmission when the current drive ratio corresponds to park or neutral.

6. The method of claim 1, further comprising operating, by the control module, the one or more valves in accordance with a priming pulse command to pulse a braking clutch prior to pulsing the highest priority clutch.

7. The method of claim 1, further comprising obtaining a current temperature measurement from a temperature sensor associated with the transmission, wherein obtaining the plurality of weighting factors comprises identifying the plurality of weighting factors corresponding to the current temperature measurement.

8. The method of claim 1, wherein operating the one or more valves in accordance with the pulse command to pulse the highest priority clutch comprises actuating a piston associated with the highest priority clutch from an exhausted state to an intermediate actuation state without engaging the highest priority clutch.

9. A vehicle comprising:
   a transmission including a plurality of clutches;
   one or more valves operable to control operation of the plurality of clutches;
   a data storage element comprising computer readable instructions; and
   a processing device for executing the computer readable instructions, the computer readable instructions controlling the processing device to perform operations comprising:
      obtaining a plurality of weighting factors, wherein each respective weighting factor of the plurality of weighting factors is associated with a respective clutch of the plurality of clutches;
      obtaining, for each respective clutch of the plurality of clutches, an exhaustion time associated with the respective clutch;
      determining, for each respective clutch of the plurality of clutches, a respective priority metric associated with the respective clutch based at least in part on the exhaustion time associated with the respective clutch and the respective weighting factor associated with the respective clutch;
      determining a highest priority clutch of the plurality of clutches based at least in part on the respective priority metrics associated with the respective clutches of the plurality of clutches; and
      operating the one or more valves in accordance with a pulse command to pulse the highest priority clutch with a commanded pressure for a commanded period of time.

10. The vehicle of claim 9, further comprising a temperature sensor to obtain a current temperature measurement associated with the transmission, wherein the plurality of weighting factors are influenced by the current temperature measurement.

11. The vehicle of claim 9, wherein the computer readable instructions control the processing device to perform operations further comprising:
   determining an updated highest priority clutch of the plurality of clutches based at least in part on the respective priority metric associated with the respective clutches of the plurality of clutches after resetting a timer for the exhaustion time associated with the highest priority clutch, wherein the updated highest priority clutch is different from the highest priority clutch; and operating the one or more valves in accordance with a second pulse command to pulse the updated highest priority clutch with a second commanded pressure for a second commanded period of time after pulsing the highest priority clutch.

12. The vehicle of claim 9, wherein the computer readable instructions control the processing device to perform operations further comprising identifying the plurality of clutches of the transmission of the vehicle that are disengaged based on a current drive ratio indicated by a range selection device.

13. The vehicle of claim 12, wherein the plurality of clutches comprises a plurality of rotating clutches of the transmission when the current drive ratio corresponds to park or neutral.

14. The vehicle of claim 9, wherein the computer readable instructions control the processing device to perform operations further comprising operating the one or more valves in accordance with a priming pulse command to pulse a braking clutch prior to pulsing the highest priority clutch.

15. A vehicle system, comprising:
a transmission including a plurality of clutches;
a pressure source;
one or more valves coupled between the pressure source and the plurality of clutches to control pressure applied to the plurality of clutches; and
a control module coupled to the one or more valves to determine, for each respective clutch of the plurality of clutches, a respective priority metric associated with the respective clutch based at least in part on an exhaustion time associated with the respective clutch and a respective weighting factor associated with the respective clutch, identify a highest priority clutch of the plurality of clutches based at least in part on the respective priority metrics associated with the respective clutches of the plurality of clutches, and operate the one or more valves in accordance with a pulse command to pulse the highest priority clutch with a commanded pressure for a commanded period of time.

16. The vehicle system of claim 15, further comprising a temperature sensor to obtain a current temperature measurement associated with the transmission, wherein the control module is coupled to the temperature sensor to identify the respective weighting factor in a manner that is influenced by the current temperature measurement.

17. The vehicle system of claim 15, wherein the control module is configured to dynamically determine an updated highest priority clutch of the plurality of clutches based at least in part on the respective priority metric associated with the respective clutches of the plurality of clutches after resetting a timer for the exhaustion time associated with the highest priority clutch and operate the one or more valves in accordance with a second pulse command to pulse the updated highest priority clutch with a second commanded pressure for a second commanded period of time after pulsing the highest priority clutch, wherein the updated highest priority clutch is different from the highest priority clutch.

18. The vehicle system of claim 17, further comprising a range selection device to provide a signal indicative of a current drive ratio of the transmission, wherein the control module is coupled to the range selection device to identify the plurality of clutches of the transmission that are disengaged based on the current drive ratio.

19. The vehicle system of claim 18, wherein the plurality of clutches comprises a plurality of rotating clutches of the transmission.

20. The vehicle system of claim 19, wherein the control module is configured to operate the one or more valves in accordance with a priming pulse command to pulse a braking clutch prior to pulsing the highest priority clutch of the plurality of rotating clutches.

* * * * *